United States Patent [19]
Buchman et al.

[11] Patent Number: 5,062,112
[45] Date of Patent: Oct. 29, 1991

[54] TWO CELL LASER RAMAN CONVERTER

[75] Inventors: William W. Buchman, Los Angeles; Katherine B. Strahm, Manhattan Beach, both of Calif.

[73] Assignee: Hughes Aircraft Company, Los Angeles, Calif.

[21] Appl. No.: 686,840

[22] Filed: Apr. 17, 1991

Related U.S. Application Data

[63] Continuation of Ser. No. 484,340, Feb. 26, 1990, abandoned.

[51] Int. Cl.$^5$ .................................................. H01S 3/30
[52] U.S. Cl. ........................................... 372/3; 372/97; 359/327
[58] Field of Search .............................. 372/3, 97, 101; 307/426

[56] References Cited

U.S. PATENT DOCUMENTS

| | | | |
|---|---|---|---|
| 4,136,318 | 1/1979 | Kruse, Jr. ............................... | 372/3 |
| 4,144,464 | 3/1979 | Loree et al. ........................... | 372/21 |
| 4,280,109 | 7/1981 | Stappaerts ........................... | 307/426 |
| 4,633,103 | 12/1986 | Hyman et al. ......................... | 372/3 |
| 4,933,943 | 6/1990 | Narhi et al. ............................ | 372/3 |

OTHER PUBLICATIONS

"Generation of Infrared Radiation as a Result of Stimulated Raman Scattering in Rotational Transitions", by Yu. A. Il'inskii and V. D. Taranukhin, Sov. J. Quant, Electron, vol. 5, No. 2, Aug. 1975, p. 1710175.
"Reduction of Threshold for Stimulated Brillouin Scattering Phase Conjugation Through use of Multiple Sequential Foci", by C. W. Clendening, R. Aprahamian, M. Trepka, R. Wagner, H. A. Sayadian, Apr., Cleo '89.
"An Efficient Solid State Source of 455 and 459 Nanometers", by S. R. Bowman, R. Burnham, B. J. Feldman, J. M. McMahon from 1988 Tuneable Solid State Laser Conference, pp. 470–472.
"Laser Techniques and Frequency Conversion for a Neodymium Based Blue Communication Transmitter", by S. R. Bowman, B. J. Feldman, J. M. McMahon, pp. 152–154.
"Generation of 1.54 Micron Radiation from Yag--Pumped Raman Media and Nonlinear Crystals", by J. T. Lin, pp. 187–191.

Primary Examiner—Léon Scott, Jr.
Attorney, Agent, or Firm—William J. Streeter; Wanda K. Denson-Low

[57] ABSTRACT

A two-cell Raman converter for generating a relatively large number of Stokes shifted waves from an input laser pump beam. A first lens focuses the pump beam into the first cell, whose output is recollimated and focused by second and third lenses into the second cell. The second cell output is recollimated by a recollimating lens to provide the final output. Each Raman cell employs stimulated rotational Raman scattering and Raman media at low pressures optimized to achieve maximum conversion into Stokes lines.

20 Claims, 1 Drawing Sheet

TWO CELL LASER RAMAN CONVERTER

This is a continuation of application Ser. No. 484,340, filed Feb. 26, 1990.

BACKGROUND OF THE INVENTION

1. Field of the Invention

The subject invention relates to lasers and, more particularly, to a method and apparatus employing stimulated Raman scattering for obtaining a larger number of Stokes shifted waves from a laser pump than heretofore possible.

2. Description of Related Art

Stimulated Raman scattering (SRS) was discovered at Hughes Aircraft Company in 1962. Until about 10 years ago, SRS was of scientific importance and was used as a tool for various spectroscopic tasks, but was not generally applied to the generation of new laser lines with substantial energy or power. At Hughes, use of Raman conversion was finally made for a laser cloud height indicator, and later for an eyesafe rangefinder (MELIOS). These systems used methane ($CH_4$) as a vibrational Raman medium. The ordinary Nd:YAG line at 1.064 microns was shifted to 1.54 microns, which was considered eyesafe at the energy produced. Other commonly used Raman media are hydrogen ($H_2$) and deuterium ($D_2$).

For some applications, stimulated rotational Raman scattering (SRRS) has been considered more desirable than vibrational SRS. The rotational excitation of most molecules is of much lower energy than the vibrational excitation, and thus produces a smaller wavelength shift. Some prior art Stokes wave generators have used a single cell employing stimulated rotational Raman scattering (SRRS) to convert the pump wavelength into a series of longer wavelengths. Such prior art approaches to generation of Stokes shifted waves have typically exhibited two, or possibly three, Stokes lines in the output. Attempts to obtain more orders by increasing the intensity in such single cell system failed because of optical breakdown of the Raman medium.

Another device which has been used to generate Stokes shifted waves is an oscillator-amplifier configuration or master oscillator power amplifier (MOPA). Such an amplifier employs two cells. In a MOPA, a small portion of the pump is diverted into an oscillator cell, where a seed is created to drive an amplifier cell. Low power levels within the oscillator provide good seed beam quality. The seed from the oscillator is combined with the remainder of the pump energy inside the amplifier, where the stimulated emission process provides amplification of the seed, generating a high power Raman shifted output with good beam quality. Other experimenters have used this configuration to achieve high conversion efficiency into a single Stokes line. However, the configuration has not generated a large number of Stokes shifted waves.

SUMMARY OF THE INVENTION

Accordingly, it is an object of the invention to increase the number of Stokes shifted waves producible from a laser pump;

It is another object of the invention to improve Raman converters; and

It is another object of the invention to employ stimulated rotational Raman scattering to obtain a relatively large number of Stokes shifted waves.

The invention comprises two or more cells wherein a laser pump wave is converted into radiation of longer wavelengths by stimulated Raman scattering (SRS). The output of the first cell, including any residual pump and Stokes components, is passed into a similar second cell. Each Stokes wave acts as a pump for the next higher order Stokes wave. Pressures in the two cells are optimized to achieve maximum conversion of pump energy into Stokes lines. The particular implementation uses stimulated rotational Raman scattering (SRRS) with cell pressures optimized for maximum rotational Stokes gain.

The invention produces a larger number of Stokes shifted waves from a laser pump than is possible from a single cell. A large number of Stokes shifted waves is obtained because the multiple cell concept increases the Raman gain length and provides a "seed" for the process in cells following the first.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Raman converter system optimized to generate a relatively large number of rotational Stokes shifted waves.

According to the basic principle of stimulated Raman scattering, photons with wavelength $\lambda_1$ excite a material which will then emit a photon at a longer wavelength $\lambda_2$, while leaving energy in the material in the form of heat. The difference between the wavelengths $\lambda_1$ and $\lambda_2$ is characteristic of the material. Energy of wavelength $\lambda_1$ is referred to as the pump, while wavelength $\lambda_2$ is the first Stokes line. Energy of polychromatic wavelength $\lambda_2$ can undergo a similar transition to generate wavelength $\lambda_3$, the second Stokes line, and so on, to higher order Stokes lines. The intensity of the Stokes wavelength produced is given by:

$$I_s = I_{so} \exp(g_s I_p z) \tag{1}$$

where:

$I_s$ = intensity of Stokes line produced
$I_{so}$ = initial intensity of Stokes line
$g_s$ = Raman gain
$I_p$ = intensity of line pumping that Stokes order
$Z$ = gain length This equation holds for each Stokes order.

Figure 1:
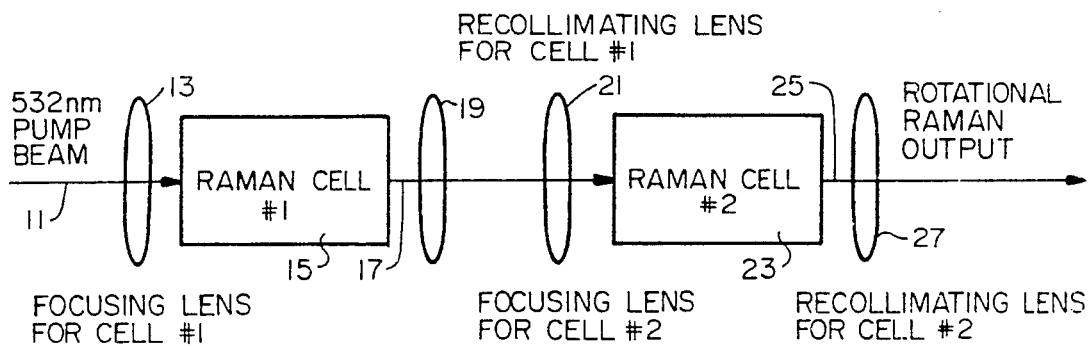
FIG. 1 is a block schematic diagram of the preferred embodiment of the invention.

FIG. 1 illustrates a system including first and second Raman cells 15, 23 and four lenses 13, 19, 21, 27. A pump beam 11 is focused by the first focusing lens 13, and the focused beam is supplied to the first Raman cell 15. The output 17 of the first Raman cell 15 is recollimated by a first recollimating lens 19, whose output is focused by a second focusing lens 21 and supplied to the second Raman cell 23. The output 25 of the second Raman cell 23 is supplied to the second recollimating lens 27, which recollimates the light into the final rotational Raman output.

According to the preferred embodiment, each Raman cell 15, 23 contains the material or Raman medium which participates in the SRS process. The pump energy preceding the cell is focused to generate the high intensity, $I_p$, within the material, and the output radiation is recollimated. The advantage of two cells over a single cell can be seen from Equation (1). The Stokes lines produced in the first cell 15 provide a higher initial Stokes intensity, $I_{so}$, in the second cell 23, and the second cell 23 provides additional gain length, z.

In the preferred embodiment, the Raman medium in each of the first and second Raman cells 15, 23 is hydrogen ($H_2$). The objective is to distribute the energy of the input pump beam 11 as uniformly as possible into five rotational lines of $H_2$; that is, 549, 567, 587, 608, and 630 nanometers (nm).

In order to achieve maximum conversion into the rotational lines, while avoiding any significant generation of unwanted vibrational lines, the pressure in each Raman cell 15, 23 is individually optimized. In one implementation according to the preferred embodiment, the optimized pressures are 10 pounds per square inch gauge (psig) $H_2$ for the first Raman cell 15 and 20 psig $H_2$ for the second Raman cell 23.

In the same implementation, the pump beam 11 is a 532-nanometer (nm) laser beam produced by a phase conjugated, frequency doubled Nd:YAG laser, as known in the art. The pump 11 is preferably generated by a MOPA configuration and is circularly polarized so as not to excite vibrational SRS. The input pump energy is approximately 230 milliJoules (mJ) with a beam diameter of 6 millimeters, divergence of 0.6 milliradians, and a pulsewidth of 25 nanoseconds full width at the half maximum. The first lens 13 has a focal length of +50 centimeters and focuses the input pump beam 11 to generate an approximate intensity ($I_p$) of 13 Giga-Watts/centimeter$^2$ (GW/cm$^2$) within the first Raman cell 15. The second lens 19 has a focal length of +50 centimeters and recollimates the output of the first cell 15. This output consists of approximately:

| Pump | 23 mJ |
|---|---|
| 1st Stokes | 58 mJ |
| 2nd Stokes | 108 mJ |
| 3rd Stokes | 30 mJ |

The third lens 21 has a focal length of +50 centimeters and focuses the radiation into the second Raman cell 23, generating initial Stokes intensities ($I_{so}$) within the second Raman cell 23 of:

| Pump | 1.3 GW/cm$^2$ |
|---|---|
| 1st Stokes | 3.3 GW/cm$^2$ |
| 2nd Stokes | 6.1 GW/cm$^2$ |
| 3rd Stokes | 1.7 GW/cm$^2$ |

The output of the second cell 23 is recollimated into the final output by the fourth lens 27, which has a focal length of +50 centimeters.

In operation, the output of the first cell 15 consists of 30-40% conversion into the first two rotational Stokes lines and approximately 10% conversion into the third Stokes line. Small amounts of the fourth and fifth rotational Stokes lines and the first vibrational Stokes line are also present.

Figure 2:
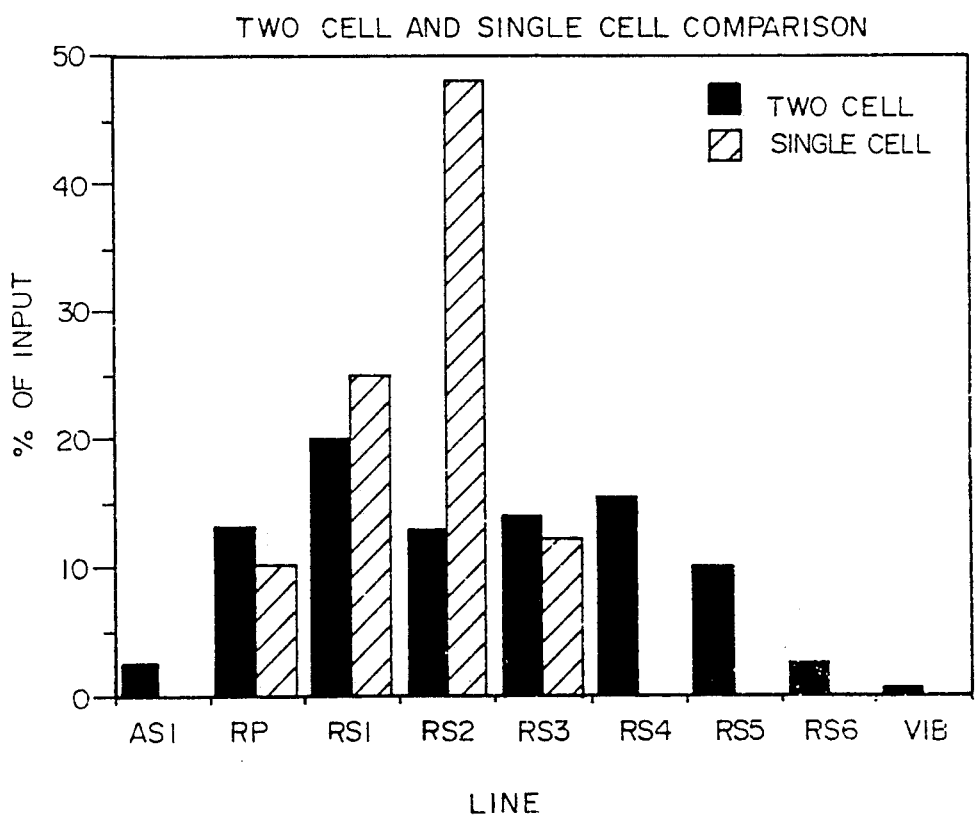
FIG. 2 is a graph illustrative of the operation of the preferred embodiment.

As noted above, the use of the second cell 23 provides additional gain length which avoids saturation and allows the generation of the higher order Stokes lines. The output of the first cell 15 acts as a seed for the generation of the higher order Raman lines in the second cell 23. The wavelength distribution obtained with the two-cell configuration is shown in FIG. 2, and includes a relatively broad and level distribution from the 532-nm pump wavelength through the fifth rotational Stokes line at 630 nm. Approximately 2.5% of the total output was measured in the sixth Stokes line at 655 nm and small amounts of the seventh Stokes and the first three anti-Stokes lines were also observed. An overall efficiency greater than 75% was maintained for conversion of the 532-nm pump energy into the various Raman lines. The two-cell configuration has, therefore, been shown to provide a much broader wavelength distribution than the single cell configuration, while still maintaining a high overall energy conversion efficiency.

For both single and double cell configurations, conversion efficiency to higher Stokes orders depends upon the pump laser characteristics and upon the geometry used to focus the pump into the Raman cell(s). In comparing examplary single cell and double cell performance, the laser and focusing characteristics were the same in both cases:

Input energy—230 mJ

Pump beam divergence—0.6 mrad

Focusing configuration—F/80 (50 cm focal length, 0.6 cm beam diameter)

The conversion to Stokes orders (and energy remaining in the residual pump) are expressed in terms of percentage of the input energy. (For example, if a 100 mJ pump produced 10 mJ of a Stokes line, the conversion efficiency of that line is 10%.) Typical conversion efficiencies for the single cell and double cell configurations are shown below and are graphed in FIG. 2.

|  | Single Cell (%) | Double Cell (%) |
|---|---|---|
| Residual Pump | 10.0 | 12.0 |
| First Stokes | 25.0 | 12.5 |
| Second Stokes | 48.0 | 19.7 |
| Third Stokes | 12.0 | 14.0 |
| Fourth Stokes | 0.0 | 15.1 |
| Fifth Stokes | 0.0 | 10.0 |
| Sixth Stokes | 0.0 | 2.4 |

The two-cell converter of the preferred embodiment thus produces many higher order Stokes waves. For rotational Raman conversion, pressure in the cells is much lower than for the vibrational MOPA configuration described above. Saturation because of a scarcity of molecules of the Raman medium becomes much more significant. Conversion to as many Stokes orders as possible is desired in the first cell 15. The second cell 23 is not used to amplify the input faithfully, but to obtain additional Stokes orders.

The two-cell configuration has a clear and obvious advantage over the single cell approach, as shown by the data and figures presented. The two-cell configuration efficiently generates at least 10% conversion in the first five rotational Stokes orders. Neither the single cell nor the oscillator/amplifier design can duplicate this performance for the higher order Stokes lines. The single cell is limited to only the first three Stokes orders due to dielectric breakdown of the Raman medium and saturation of the number of molecules in the high intensity focal region.

The MOPA configuration described above is limited to one line. The MOPA oscillator has the same limitations as a single cell device, i.e., the amplifier can only amplify the Stokes orders already generated in the oscillator, because the collimated geometry within the amplifier does not produce high enough intensities to exceed threshold.

Therefore, the invention has provided the efficient generation of two more rotational Raman orders than can be generated by either of the configurations used in the prior art. With optimization of the two-cell design, generation of additional orders beyond those already demonstrated may be expected.

For constant pump intensity and low Stokes intensity, a Stokes wave grows according to Equation (1) above. Because the gain per unit length is proportional to the pump intensity, the distance taken to convert a pump wave to a Stokes wave is shorter where the pump beam intensity is high. In practice, the pump intensity varies with radial and longitudinal position in the beam. Because of the varying pump intensities in time and space, the output will be a combination of residual pump wavelength and several Stokes orders. Where the pump intensity is high, more conversion to higher Stokes orders will occur than in areas where the pump intensity is lower.

The threshold intensity for SRS is usually so high that threshold is not readily obtained for collimated beams in gases. By focusing the beam into the cell with a lens, an intensity high enough to exceed threshold can be obtained near the focal point. The length of this high intensity region is often described by a term called the "confocal parameter." The confocal parameter is defined as $2z_o$, where $z_o$ is a scale length for the beam known as the Rayleigh range. The Rayleigh length can be calculated using $$z_o = \frac{\pi w_o^2}{\lambda}$$

where $w_o$ is the radius of the beam waist and $\lambda$ is the wavelength of the radiation. The conversion efficiency is a function of gain (which is a function of intensity) and interaction length (expressed by the confocal parameter). Shorter focal length results in a shorter confocal parameter, higher intensity within that region, and thus higher gain there. However, the increase in gain is just cancelled by the decrease in the length of the confocal parameter. Conversion efficiency, in principle, does not depend upon focal length. However, in practice, long focal length results in large confocal parameters, so that the high gain region cannot be confined within a cell of reasonable length. The benefit of short focal length lenses is that cell length can be made small, but this does not increase the Raman conversion efficiency. The focal length, however, must be sufficiently large to avoid optical breakdown of the gas, stimulated Brillouin scattering (SBS), or any one of the other competing nonlinear optical effects.

Using two cells according to the preferred embodiment allows intensity to be reduced to where there is no gas breakdown. Two or more cells can be arranged in a folded configuration. To obtain more gain, more cells may be added. It is necessary to transfer the higher order Stokes waves into the second cell in order for them to seed the cell for even high order Stokes waves. Although not currently implemented, it may be possible to use optical dispersion or other means to modify the paths of the various Stokes orders to obtain further control of the conversion process.

As may be appreciated from the foregoing discussion, those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A Raman converter for generating a large number of Stokes shifted waves from a pump beam comprising:
    a first Raman cell means for receiving a pump beam having a single pump wavelength and producing a first output beam consisting of a first plurality of wavelengths, said first Raman cell means containing a first Raman medium at a first optimized low pressure; and
    a second Raman cell means for receiving said first output beam consisting of said first plurality of wavelengths and producing a second output beam by exciting said second Raman cell by said first plurality of wavelengths, said second output beam consisting of a second plurality of wavelengths, said second Raman cell means containing a second Raman medium at a second optimized low pressure.

2. The Raman converter of claim 1 wherein said first Raman cell means comprises:
    a first Raman cell; and
    a first focusing means for receiving said pump beam from a laser pump and focusing said pump beam into said first Raman cell.

3. The Raman converter of claim 2 wherein said second Raman cell means comprises:
    a second Raman cell;
    means for receiving said first output beam from said first Raman cell and recollimating said first output beam to produce a recollimated beam; and
    a second focusing means for receiving said recollimated beam and focusing said recollimated beam into said second Raman cell.

4. The Raman converter of claim 3 wherein said second Raman cell means further comprises means for recollimating said second output.

5. The Raman converter of claim 4 wherein said first Raman medium and second Raman medium each comprise hydrogen.

6. The Raman converter of claim 5 wherein said first and second optimized low pressures are 10 psig and 20 psig, respectively.

7. The Raman converter of claim 6 wherein the output of said first Raman cell includes the pump wavelength and first, second, and third Stokes lines.

8. The Raman converter of claim 7 wherein the output of said second cell includes the first, second, and third Stokes lines and fourth, fifth, and sixth Stokes lines.

9. The Raman converter of claim 1 wherein said pump beam is a circularly polarized beam generated by a master oscillator power amplifier configuration.

10. Laser apparatus comprising:
    means for generating a laser pump beam energy having a first wavelength; and
    means for distributing the pump beam energy having a single wavelength into an expanded wavelength spectrum, said distributing means being responsive to said pump beam to generate a light output including the wavelength spectrum of said pump beam and first, second, third, fourth, fifth, and sixth Stokes lines.

11. The laser apparatus of claim 10 wherein said distributing means responsive to said pump beam comprises:

first and second Raman cells, the first Raman cell providing an output consisting of a plurality of wavelengths to said second Raman cell.

12. The laser apparatus of claim 11 further including first focusing lens means for focusing said pump beam into said first Raman cell.

13. The laser apparatus of claim 12 further including a first recollimating lens means for recollimating the output of said first Raman cell consisting of said first plurality of wavelengths to produce a recollimated output consisting of said first plurality of wavelengths.

14. The laser apparatus of claim 13 further including a second focusing lens means for focusing said recollimated output consisting of said first plurality of wavelengths into said second Raman cell.

15. The laser apparatus of claim 14 further including means for recollimating the output of said second Raman cell consisting of a second plurality of wavelengths.

16. The laser apparatus of claim 11 wherein each of said first and second cells contain a Raman medium at respective pressures optimized for maximizing conversion to a plurality of Stokes lines.

17. The laser apparatus of claim 11 wherein each of said first and second cells contain a hydrogen at respective pressures of 10 psig and 20 psig, respectively.

18. The laser apparatus of claim 10 wherein said means for generating a laser pump beam comprises a master oscillator power amplifier configuration.

19. A method for distributing energy from a laser beam input into an output consisting of a spectrum having a plurality of rotational lines wherein the laser beam is input to a first Raman cell and the nonfiltered energy output from the first Raman cell is fully reprocessed by a second Raman cell to produce a polychromatic output of discrete rotational lines.

20. A method for distributing energy from a laser beam into a plurality of rotational lines comprising the steps of:

(a) providing a laser beam;
(b) focusing the laser beam into a first Raman cell to produce a first output consisting of a first plurality of wavelengths;
(c) collimating the first output consisting of the first plurality of wavelengths;
(d) focusing the collimated first output consisting of the first plurality of wavelengths into a second Raman cell to produce a second output consisting of a second plurality of wavelengths; and
(e) collimating the second output consisting of the second plurality of wavelengths to produce an energy distribution across a plurality of Stokes-orders.

* * * * *